United States Patent
Peltola

(10) Patent No.: US 9,908,982 B2
(45) Date of Patent: Mar. 6, 2018

(54) COMPOSITE MATERIAL

(71) Applicant: UPM-Kymmene Corporation, Helsinki (FI)

(72) Inventor: Piia Peltola, Hameenlinna (FI)

(73) Assignee: UPM-KYMMENE CORPORATION, Helsinki (FI)

(*) Notice: Subject to any disclaimer, the term of this patent is extended or adjusted under 35 U.S.C. 154(b) by 0 days.

(21) Appl. No.: 14/714,379

(22) Filed: May 18, 2015

(65) Prior Publication Data
US 2016/0068644 A1 Mar. 10, 2016

(30) Foreign Application Priority Data
Sep. 5, 2014 (FI) .................................... 20145776

(51) Int. Cl.
*C08J 9/00* (2006.01)
*B23B 27/20* (2006.01)
(Continued)

(52) U.S. Cl.
CPC ............. *C08J 9/0023* (2013.01); *B32B 5/18* (2013.01); *B32B 27/065* (2013.01); *B32B 27/08* (2013.01); *B32B 27/20* (2013.01); *B32B 27/32* (2013.01); *C08J 9/0066* (2013.01); *C08J 9/02* (2013.01); *C08K 11/005* (2013.01); *B32B 2250/02* (2013.01); *B32B 2250/24* (2013.01); *B32B 2264/0264* (2013.01); *B32B 2264/062* (2013.01); *B32B 2264/10* (2013.01); *B32B 2266/025* (2013.01); *B32B 2266/0257* (2013.01); *B32B 2272/00* (2013.01); *B32B 2305/08* (2013.01); *B32B 2305/30* (2013.01);
(Continued)

(58) Field of Classification Search
CPC .......... B32B 27/065; B32B 2266/0257; B32B 2266/025; B32B 2266/0264; C08J 9/02; C08J 9/0066
See application file for complete search history.

(56) References Cited

U.S. PATENT DOCUMENTS 3,895,997 A 7/1975 Haywood
4,356,060 A * 10/1982 Neckermann ......... C04B 18/021
162/181.6
(Continued)

FOREIGN PATENT DOCUMENTS

| CN | 1385465 | 12/2002 |
|----|---------|---------|
| CN | 1385465 A | 12/2002 |

(Continued)

OTHER PUBLICATIONS

Ilyina et al., "Using of Biodac (Absorbent Granules Produced from Paper Industry Residues) As Carrier to Microorganisms for Soil Production" Biocatalysis—2000, vol. 41, No. 6 and pp. 135-138.*

(Continued)

*Primary Examiner* — Hai Vo
(74) *Attorney, Agent, or Firm* — Cantor Colburn LLP

(57) ABSTRACT

The present application relates to a natural fiber plastic composite product comprising thermoplastic polymer and dried deinking sludge containing cellulose fibers and minerals in foamed form. The present application also relates to a method for preparing the natural fiber plastic composite product.

14 Claims, 5 Drawing Sheets

(51) Int. Cl.
  B32B 27/32   (2006.01)
  B32B 5/18    (2006.01)
  B32B 27/08   (2006.01)
  B32B 27/06   (2006.01)
  C08J 9/02    (2006.01)
  C08K 11/00   (2006.01)
  B32B 27/20   (2006.01)
  C08L 77/00   (2006.01)

(52) U.S. Cl.
  CPC ....... B32B 2419/00 (2013.01); B32B 2479/00 (2013.01); C08J 2323/06 (2013.01); C08J 2323/12 (2013.01); C08J 2401/02 (2013.01); C08L 77/00 (2013.01)

(56) References Cited

U.S. PATENT DOCUMENTS

| | | | |
|---|---|---|---|
| 4,506,037 | A * | 3/1985 | Suzuki ............... C08J 3/203 427/180 |
| 5,496,441 | A | 3/1996 | Tran |
| 5,795,377 | A | 8/1998 | Tanner et al. |
| 5,985,772 | A | 11/1999 | Wood et al. |
| 6,017,595 | A | 1/2000 | Brenot et al. |
| 6,322,737 | B1 | 11/2001 | Beyer |
| 2002/0018907 | A1* | 2/2002 | Zehner ............... B32B 23/08 428/537.1 |
| 2002/0177663 | A1 | 11/2002 | Cahill |
| 2003/0021915 | A1 | 1/2003 | Rohatagi et al. |
| 2003/0030176 | A1* | 2/2003 | Monovoukas ......... C08L 23/04 264/211 |
| 2003/0087994 | A1* | 5/2003 | Frechette ............. C08J 5/045 524/9 |
| 2010/0133726 | A1 | 6/2010 | White |
| 2012/0261351 | A1 | 10/2012 | Rathallaigh |
| 2013/0245193 | A1 | 9/2013 | Bedel |
| 2016/0067949 | A1* | 3/2016 | Peltola ............... B32B 27/08 428/318.6 |
| 2016/0068668 | A1* | 3/2016 | Peltola ............... C08L 23/12 428/507 |

FOREIGN PATENT DOCUMENTS

| | | | |
|---|---|---|---|
| CN | 101864104 | | 10/2010 |
| CN | 103275413 | A * | 9/2013 |
| CN | 103290741 | A | 9/2013 |
| EP | 1275699 | A | 1/2003 |
| EP | 2216365 | A1 | 8/2010 |
| JP | 0967520 | A | 3/1997 |
| JP | 2000025141 | A | 1/2000 |
| JP | 2000319405 | A | 11/2000 |
| JP | 2005060689 | A | 3/2005 |
| JP | 2005179446 | A | 7/2005 |
| JP | 2006305802 | A | 11/2006 |
| JP | 2007021762 | A | 2/2007 |
| JP | 2011153297 | A | 8/2011 |
| WO | 2013022025 | A1 | 2/2013 |
| WO | 2013073396 | A1 | 5/2013 |
| WO | 2014080084 | A1 | 5/2014 |

OTHER PUBLICATIONS

'Polystyrene'. The Wikipedia [online]. 15 pages [retrieved on Jul. 22, 2016]. Retrieved from the Internet : < URL: https://en.wikipedia.org/wiki/Polystyrene>.*

Translation of CN 103275413, Y. Yu, Sep. 4, 2013, p. 1-9. (Year: 2013).*

Hamseh, Yahya, "A Comparative Study on the Effects of Coriolus Versicolor on Properties of HDPE/Wood Flour/Paper Sludge Composites", Composites Part B: Engineering, vol. 43, No. 5, Nov. 13, 2011; pp. 2409-2414.

Qiao, Xiuying et al.,"Ink-Eliminated Waste Paper Sludge Flour-Filled Polypropylene Composites with Different Coupling Agent Treatments", Journal of Applied Polymer Science, vol. 89, No. 2, Apr. 24, 2003; pp. 513-520.

Peltola, et al., U.S. Appl. No. 14/714,373, filed May 18, 2015 (39 pages).

Peltola, U.S. Appl. No. 14/714,382, filed May 18, 2015 (39 pages).

Non Final Office Action for U.S. Appl. No. 14/714,382, filed May 18, 2015; dated Mar. 30, 2016; 28 pages.

Non Final Office Action for U.S. Appl. No. 14/714,373, filed May 18, 2015; dated May 19, 2016; 32 pages.

Nylon 6, Polymer Processing.com, 2 pages. Downloaded Jun. 15, 2016.

"China Plastic Machinery Industry Yearbook 2011", by Editorial Board of China, Plastic Machinery Industry Yearbook, Mechanical Industry Press, Mar. 2012; p. 71.

Bing Yue, Liu et al, "Technologies for Regeneration of Fibers and Deinking of Waste Paper", Chemical Industry Press, Apr. 2005; p. 23.

Processing Aids for Plastics and Rubbers, by the Chemical Research Institute of Shanxi Province, China, Chemical Industry Press, 2002; pp. 662 and p. 664.

Quan, Wan Jin et al.,"Introduction to Environmental Engineering of Paper Making Industry", China Light Industry Press, Auguste 2005; p. 327.

* cited by examiner

COMPOSITE MATERIAL

FIELD OF THE APPLICATION

The present application relates to natural fiber plastic composites, products containing thereof and method for preparing said composites and products. More particularly the present application relates to natural fiber plastic composites containing deinking sludge as filler and/or reinforcement material.

BACKGROUND

Natural fiber plastic composite products typically comprise organic fiber material, usually originating from wood, such as saw dust, and at least one kind of plastic polymer. The composite products may be used for several purposes, for example for furniture, deck floors, fences, window frames, and door frames.

SUMMARY

It was found out that deinking sludge may be used as a filler and/or reinforcement material in natural fiber plastic composite products. Deinking sludge is formed as a side stream in deinking process and it typically contains mineral fillers, fibers and inks. So far the side stream has been used as a landfill or burnt. A typical content of a dried sludge includes about 20% (w/w) of cellulose fibers and about 70% of minerals, mainly calcium carbonate. The amount of the ink is small but however significant as it affects the appearance of the final product and makes the use of the sludge in composite products very challenging.

One embodiment provides a natural fiber plastic composite product comprising thermoplastic polymer and dried deinking sludge containing cellulose fibers and minerals in foamed form.

One embodiment provides a method for preparing said natural fiber plastic composite containing deinking sludge.

One embodiment provides composite products containing said natural fiber plastic composite containing deinking sludge.

One embodiment provides a natural fiber plastic composite product comprising a first layer and a second layer, the first layer forming at least a part of the surface of the product, wherein
  the first layer comprises thermoplastic polymer and cellulose based particles, and
  the second layer comprises thermoplastic polymer and deinking sludge containing cellulose fibers and minerals.

One embodiment provides a method for manufacturing a natural fiber plastic composite product, the method comprising
  forming a first layer of the product, the first layer comprising thermoplastic polymer material and cellulose based particles, the first layer forming at least a part of the surface of the product, and
  forming a second layer of the product from a mixture comprising thermoplastic polymer and deinking sludge containing cellulose fibers and minerals.

The main embodiments are characterized in the independent claims. Various embodiments are disclosed in the dependent claims. The features recited in dependent claims are mutually freely combinable unless otherwise explicitly stated.

When substituting commercial fillers with material that is generally considered as a waste material, effects relating to environmental load are provided.

In one aspect the amount of waste in landfills is reduced when said waste materials are utilized elsewhere. Also the need to burn the waste decreases so less greenhouse gases will be released. Furthermore, relative high amounts of deinking sludge may be incorporated into the composite material.

In another aspect the amount of virgin filler materials, such as talcum or calcium carbonate, is reduced and non-renewable natural resources are used in lower amounts. For example the mining and reprocessing such as grinding of the virgin filler consumes a lot of energy and resources. Financially the saving potential is huge since the total cost of the side streams is estimated being about 18 M€. If these side streams may be transformed into new products, such as fillers and reinforcements materials, the financial value grows even higher.

When replacing virgin fillers and/or reinforcement fibers in a composite with deinking sludge, which generally has lower fiber content, higher temperatures may be used in the preparation process of the composite products. This provides an effect of enabling the use of thermoplastic polymers having a relatively high melting temperature without harming the filler and reinforcement materials. This enables the preparation of heat resistant composites, which may be used for example as technical plastics or for replacing polyamide glass fibers.

When foaming the polymer containing recycled sludge, high melt strength of the product was obtained with relatively high filler content. This is generally challenging and provides an effect of obtaining products with high quality, such as increased stiffness and dimensional stability, together with decreased weight and cost.

The obtained composite materials having good melt strength enable the preparation of durable and homogenous products, which may be used for example in products with thin layers or walls.

When the composite material containing the deinking sludge is used in composite products having at least two layers, the unpleasant appearance of the recycled ink-containing material may be covered with another composite layer which however is compatible with the sludge-containing composite. This provides an effect of using the ink-containing materials in high amounts in products which have acceptable surface appearance and which, when foamed, are light and durable. The sludge-containing composite provides reinforcing properties and may be prepared in a process allowing good attachment between two different composite layers.

DETAILED DESCRIPTION

Figure 1A:
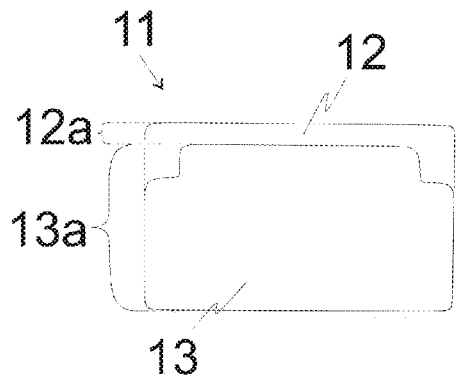
FIGS. 1a-1e show examples of a two-layered product

The percentage values disclosed herein refer to weight percentages of dry weights unless otherwise indicated. One embodiment provides a natural fiber plastic composite product comprising at least one thermoplastic polymer, organic fibers and mineral filler, wherein the composite product contains or comprises deinking sludge, which contains or comprises organic fibers, such as cellulose fibers, and minerals. The organic fibers and the mineral filler are at least partially originated from the deinking sludge. The deinking sludge may provide at least 50% (w/w) of the material containing the organic fibers and the mineral filler, or at least 60% (w/w), or at least 70% (w/w), or at least 80% (w/w), or at least 90% (w/w) or at least 95% (w/w). In one embodiment all the organic fibers and the mineral filler originate from the deinking sludge, or at least 99% (w/w). However, in some cases additional organic fibers, such as cellulose fibers, may be added to enhance the strength of the composite product, for example an amount in the range of 30-50% (w/w) of the fibers. In one example other recycled material is added as a filler and/or reinforcement material, such as material containing recycle plastics, adhesives, silicone and the like. Such materials may originate for example from paper and plastic laminates These materials may constitute about 10-90% (w/w) of the filler and/or reinforcement material in the composite product, for example 50-90% in regular composites or 10-20% in foamed composites.

Deinking is the industrial process of removing printing ink from paper fibers of recycled paper to make deinked pulp. The unusable material left over, mainly ink, plastics, filler and short fibers, is called sludge. Produced sludge may be considered to fall into two main types: high-ash sludge (>30% dry weight) and low-ash sludge (<30% dry weight). High-ash sludges are chemical flocculation sludges generated by pulp mills, primary sludges generated by production of paper from recycled fibers and deinking sludges generated by paper mills. Low-ash sludge represents primary, secondary or biological sludges generated by pulp or paper mills.

The starting material for preparing the composite product is generally formed from a sludge which contains reject from a waste paper treatment and/or a paper mill and/or a waste water treatment plant. The sludge is treated by drying in at least one drying step. The sludge contains rejects, such as sludges, rejects and residues, from a waste paper treatment and/or a paper mill and/or a waste water treatment plant. In one embodiment the sludge contains at least rejects, such as sludges, rejects and residues, from a waste paper treatment, e.g. RCF sludge. In one embodiment the sludge contains mainly rejects from a waste paper treatment, e.g. from a deinking process, such as RCF sludge. Further, the sludge may include rejects, such as sludges, rejects and residues, from a paper mill. Typically, these paper mill rejects do not include bio-sludge. Further, the sludge may include rejects, such as sludges, from a waste water treatment plant, e.g. primary sludge and/or bio sludge. Further, the sludge may include rejects, such as sludges, rejects and residues, from any paper industry process. Further, the sludge may also include sludges and rejects from other processes. In this context, RCF sludge means any RCF reject, e.g. deinking reject, or any combination of different RCF rejects from RCF process, i.e. from recirculated or recycled fiber plant, in which waste paper is treated. The sludge may include minerals used in paper coating, filler and printing inks, and fibers, fines, sticky materials like starch, latex and adhesive, and other inorganic components and/or small amount of other components, preferably other reject components. In one example the sludge includes 50-90% (w/w), for example 60-80% (w/w), inorganic components.

In one example the sludge includes below 90% (w/w), such as below 85% (w/w), inorganic components. In one example the sludge includes over 55% (w/w), such as over 60% (w/w), inorganic components. The sludge may be high solid sludge in which dry solid content may be about 50-70%. The sludge may be dewatered to form the high solid sludge before the use. In one example, the sludge is treated in the dewatering by means of a gravitation table, disc filter and/or screw press or the like.

In one example the sludge includes 50-100% (w/w) rejects from a waste paper treatment. In one example the sludge includes 80-100% (w/w) rejects from a waste paper treatment. In one example the sludge includes over 80% (w/w), preferably over 90% (w/w) rejects from a waste paper treatment. In one example the sludge contains over 80% (w/w) RCF sludge. In one example the sludge contains over 90% (w/w) RCF sludge. In one example the sludge includes 80-100% (w/w) RCF sludge. In one example the sludge includes below 50% (w/w), or below 40% (w/w), or below 30% (w/w) or below 20% (w/w) rejects from a paper mill. In one example the sludge contains below 10% (w/w) rejects from a paper mill. In one example the sludge includes below 50% (w/w), or below 40% (w/w), or below 30% (w/w) or below 20% (w/w) sludges from a waste water treatment plant. In one example the sludge contains below 10% (w/w) sludges from a waste water treatment plant. In one example the sludge includes below 50% (w/w), or below 40% (w/w) or below 30% (w/w), rejects from a paper mill and sludges from a waste water treatment plant. In one example the sludge includes below 20% (w/w) rejects from a paper mill and sludges from a waste water treatment plant. In one example the sludge includes 50-100% (w/w) rejects from a paper mill. In one example the sludge includes below 50% (w/w) rejects from a waste paper treatment.

The drying may be carried out in one or more drying steps. In one example the drying is made in one step. In one example the drying is made in at least two drying steps. Preferably, after the drying moisture content of the dried sludge is below 15%, or below 10% or below 5% or below 4% or below 3% or below 2% or below 1%.

The drying may be made by means of drying device selected from the group: indirect dryer, direct sludge dryer, paddle dryer, flash dryer, fluidized bed dryer, cyclone dryer, air dryer, air grinder, rotor mill, centrifugal mill, air turbulence mill, air turbulence dryer and other suitable dryers and other suitable mills, and their combinations. The drying may be carried out by such air dryer or air grinder in which particles may be separated one from the other. In one example the drying is carried out by a rotor mill. When the drying is made in the rotor mill so then thermal and mechanical drying may be made at the same time which ensures the fiberizing and drying of material during the drying. Then no extra fiberizing steps are needed. Also other drying devices are possible. In one example a drying device may also act as a grinder. In one example a grinder may act as a drying device. In one example fiberizing is made simultaneously with the drying. In an example low temperature may be used in the drying. In one example the sludge is dried at temperature between 25 to 170° C., preferably between 25 to 100° C. or between 100 to 170° C., more preferable between 25 to 60° C. or between 50 to 100° C. or between 100 to 160° C. It is important that temperature is selected so that organic components are not damaged. Further, residue heat, e.g. from a mill, may be used in the process of the present invention.

In one example the method comprises additional step for separating or disintegrating agglomerates after the drying of the sludge. The disintegration of the agglomerates may be made any disintegrating or crushing device known per se.

In one example the sludge is crushed in connection with the drying. In one example agglomerates are broken during the drying, and then separate crushing steps are not needed. In one example the method comprises pretreatment step for crushing the sludge before the drying. The crushing may be made by any crushing device known per se.

The deinking sludge used in the composite products is generally dried before the transportation and/or usage. The water or moisture content of the dried sludge may be in the range of 0.1-10% (w/w), such as 0.1-1% (w/w). The sludge may contain organic material in the range of 25-45% (w/w) and minerals in the range of 55-75% (w/w), usually mostly calcium carbonate (generally in the range of 50-60% (w/w) of the total content). Other minerals include kaolin and talcum. The organic material contains organic fibers, which are mainly cellulose fibers, adhesives, latex, starch and other extractive wood components such as resins, fat and resin acids. In some examples sludge contains about 17-19% of cellulose fibers. The amount of stickies (adhesives, latex, starch etc.) may be for example in the range of about 11-13%, and the amount of extractives about 0.5%. In one embodiment the sludge contains cellulose fibers in the range of 10-30% (w/w), such as in the range of 15-25% (w/w), for example in the range of 17-23% (w/w). In one embodiment the sludge contains minerals in the range of 55-75% (w/w), such as in the range of 65-75% (w/w), for example in the range of 67-73% (w/w). In one embodiment the sludge contains cellulose fibers in the range of 10-30% (w/w) and minerals in the range of 55-75% (w/w). In one embodiment the sludge contains cellulose fibers in the range of 15-25% (w/w) and minerals in the range of 65-75% (w/w). In other terms the content may be defined as organics (for example about 30%) and inorganics (for example about 70%). The total content 100% of the sludge also includes the very small amount of inks and other materials, such as the other organic materials.

The ink content may be in for example the range of 0.01-1% (w/w) of the total dry content of the sludge. The organic fibers are mostly cellulose fibers, so the cellulose content of the fibers may be in the range of 80-100%, such as 90-100%, for example 95-100%. In one example the organic fibers consist substantially of cellulose fibers, such as about 99% or about 100% cellulose fibers, or 99-100%.

In general the composite may contain the dried sludge in amounts in the range of 5-90% (w/w). In one embodiment the composite contains dried deinking sludge in an amount in the range of 30-80% (w/w). In one embodiment the composite contains dried deinking sludge in an amount in the range of 55-65% (w/w). In one embodiment the composite contains thermoplastic polymer in an amount in the range of 20-70% and dried deinking sludge in the range of in the range of 30-80% (w/w). In one embodiment the composite contains thermoplastic polymer in an amount in the range of 30-45% and dried deinking sludge in the range of in the range of 55-70% (w/w). Examples of the total amount of the deinking sludge in the dry weight of the composite include about 30%, 40%, 50%, 60%, 70%, 80% and 90% (w/w)

The composite contains at least one thermoplastic polymer or plastic. A thermoplastic is a plastic which becomes pliable or moldable above a specific temperature and returns to a solid state upon cooling. Examples of thermoplastic polymers include poly(methyl methacrylate), polyamide (Nylon), polyethylene, polypropylene, polystyrene, polyvinyl chloride, polytetrafluoride (Teflon), polyethylene terephthalate and mixtures thereof.

Thermoplastic polymer may be a thermoplastic polyolefin, or a mixture thereof, or a mixture of polyolefin and another thermoplastic polymer, or a polymer derived from a thermoplastic polymer. Examples of thermoplastic polyolefins include polyethylene, polypropylene, polymethylpentene, and polybutene-1. In one embodiment the thermoplastic polymer comprises or consists of polyolefin, such as polypropylene (PP) or polyethylene (PE). In one embodiment the thermoplastic polymer comprises polyolefin, such as polyethylene or polypropylene. In one embodiment the thermoplastic polymer is polyolefin.

In one embodiment the thermoplastic polymer has a melting temperature above 200° C. In such case the thermoplastic polymer may be selected for example from polyamide, polyethylene terephthalate (PET) and polycarbonate. Also certain polyethylenes may have such as high melting temperature.

Polypropylene is a thermoplastic polymer having a glass transition temperature of about −20° C. (atactic polypropylene) or about 0° C. (isotactic polypropylene). Examples of suitable polypropylenes or polymers derived from polypropylene include PP-homopolymers, random PP copolymers, PP block copolymers, PP terpolymers, PP elastomers and PP plastomers.

Polyethylene is a thermoplastic polymer which may be classified into several different categories based on density and branching. Examples of such categories include ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE) and chlorinated polyethylene (CPE). The melting point and glass transition temperature may vary depending on the type of polyethylene. For medium and high-density polyethylene the melting point is typically in the range of 120-180° C., and for average low-density polyethylene in the range of 105-115° C. The glass transition temperature of LDPE is about −125° C.

Polyvinyl chloride (PVC) is a polymer produced by polymerization of the monomer vinyl chloride. The heat stability of raw PVC is very poor, so the addition of a heat stabilizer during the process is necessary in order to ensure the product's properties. PVC starts to decompose when the temperature reaches 140° C., with melting temperature starting around 160° C.

In one embodiment the natural fiber plastic composite product comprises 10-80% (w/w) (dry weight) of plastic polymers, preferably thermoplastic polymers. In one embodiment the natural fiber plastic composite product comprises 20-80% (w/w) (dry weight) of plastic polymers, preferably thermoplastic polymers. In one embodiment the total amount of the thermoplastic polymers is in the range of 10-60% of the dry weight of the composite. In one embodiment the total amount of the thermoplastic polymers is in the range of 10-50% of the dry weight of the composite. In one embodiment the total amount of the thermoplastic polymers is in the range of 10-40% of the dry weight of the composite. In one embodiment the total amount of the thermoplastic polymers is in the range of 10-30% of the dry weight of the composite. Examples of the total amount of the thermoplastic polymers in the dry weight of the composite include about 10%, 20%, 30%, 40%, 50%, 60%, 70% and 80% (w/w).

In one embodiment the composite contains thermoplastic polymer in an amount in the range of 10-70% and dried deinking sludge in the range of 30-90% (w/w). In one embodiment the composite contains thermoplastic polymer in an amount in the range of 20-70% and dried deinking sludge in the range of 30-80% (w/w). In one embodiment the composite contains thermoplastic polymer in an amount in the range of 30-70% and dried deinking sludge in the range of 30-70% (w/w).

In one embodiment the thermoplastic polymers comprise polyolefins. In one embodiment the total amount of the polyolefin is at least 60% (w/w) or at least 70% (w/w), more preferably at least 75% (w/w) or at least 80% (w/w), and most preferably at least 85% (w/w) or at least 90% (w/w) of the thermoplastic polymers used in the composite.

The composite may comprise thermoplastic polymers that are virgin and/or recycled. In one example at least 50% (w/w), or at least 60% (w/w) of the thermoplastic polymers in the composite are recycled. It is also possible to use only recycled thermoplastic polymers. In one example the composite comprises at least one kind of recycled thermoplastic polymer, more preferably the composite comprises at least two kinds of recycled thermoplastic polymers. In an example, the recycled thermoplastic polymer comprises polyethylene (PE) and/or polypropylene (PP) and/or polyvinyl chloride (PVC) and/or polyethylene terephthalate (PET).

The composite may comprise a further mineral filler. The mineral filler may comprise kaolin clay, ground calcium carbonate, precipitated calcium carbonate, titanium dioxide, wollastonite, talcum, mica, silica, or a mixture thereof. The composite may further comprise additives, such as colorants, UV stabilizers, coupling agents, foaming agents (blowing agents) and lubricants. Colorants or dyes may be used to compensate the dark or even black color of the composite originating from the print inks present in the sludge. Examples of useful colorants include black and white, which may be used to obtain more acceptable color of the product. However, the colorants are usually not able to hide all the undesired color of the print inks. In one embodiment the composite contains a coupling agent. The content of the coupling agent in the composite product may be in the range of 1-3% (w/w).

The coupling agent may comprise, for example, maleic anhydride functionalized HDPE, maleic anhydride functionalize LDPE, maleic anhydride-modified polyethylene (MAHPE), maleic anhydride functionalized EP copolymers, acrylic acid functionalized PP, HDPE, LDPE, LLDPE, and EP copolymers, styrene/maleic anhydride copolymers, vinyl trialkoxy silanes, or combinations thereof.

One embodiment provides a method for manufacturing natural fiber plastic composite product, the method comprising providing a thermoplastic polymer and deinking sludge containing cellulose fibers and minerals, mixing the materials and forming the mixture into a composite product. The thermoplastic polymer may be provided as a granular or particle form. This refers to a physical state of a granular substance wherein the substance has a sufficiently small particle size whereby this substance, itself, becomes an aggregate of substantially free fluidity. This term includes states of substances as fine as powder form. After mixing the materials the mixture is heated to a desired temperature to melt the thermoplastic polymer and to form melt which can be formed into the desired product. The forming may include for example shaping the composite material into a composite article. After forming the composite product the thermoplastic polymer is allowed to harden or cool to obtain the final product. The process may be a batch process or a continuous process.

In one example the method for manufacturing natural fiber plastic composite product comprises
  providing
    a thermoplastic polymer and
    deinking sludge containing cellulose fibers and minerals,
  mixing the materials,
  heating the mixture above the melting temperature of the thermoplastic polymer, and
  forming the mixture into a composite product. In one embodiment the deinking sludge is provided as dried.

The melting temperature or melting point of the thermoplastic polymer may be for example about 120° C., about 130° C., about 150° C., about, 155° C., about 160° C., about 170° C., about 180° C., about 190° C., about 200° C., about 220° C. about 300° C. or even about 327° C. One example of a very high melting point is that of polyamide (Nylon), about 190-350° C., or polytetrafluoride (Teflon), about 327° C. "Above the melting temperature of the thermoplastic polymer" refers to a temperature wherein the thermoplastic polymer melts at least partially and can be processed, and it may include the melting temperature.

In one example the method for manufacturing natural fiber plastic composite product comprises
  providing a thermoplastic polymer and deinking sludge containing cellulose fibers and minerals,
  mixing the materials,
  heating the mixture to melt the thermoplastic polymer at least partially, and
  forming the mixture into a composite product.

The temperature used for melting the thermoplastic polymer may be for example in the range of 120-380° C., such as 150-360° C., such as 180-360° C. Generally temperatures up to 380° C. may be used, but in general the temperature may be up to 360° C., up to 350° C., up to 340° C., up to 330° C. or up to 300° C. In one embodiment the temperature is in the range of 200-360° C. In one embodiment the temperature is in the range of 200-340° C. In one embodiment the temperature is in the range of 200-300° C. In one embodiment the temperature is in the range of 220-360° C. In one embodiment the temperature is in the range of 220-340° C. In one embodiment the temperature is in the range of 220-300° C. In one embodiment the temperature is in the range of 240-360° C. In one embodiment the temperature is in the range of 250-360° C. When using high temperatures, such as over 200° C. or over 210° C. or over 220° C. or over 230° C. or over 240° C., polymers such as polystyrene, polyamide, polytetrafluoride, polyethylene terephthalate (PET), poly(methyl methacrylate) and polycarbonate (PC) may be used. These materials have a high melting point and therefore the obtained products will also tolerate high temperatures. At lower temperatures, such as below 180° C. or below 160° C., also polyolefins may be used. With polyolefins a temperature for example in the range of 120-190° C. or 120-180° C. may be used. In one example the temperature is in the range of 150-200° C. In one example the temperature is in the range of 180-200° C. In one example the temperature is in the range of 180-220° C.

In one embodiment the thermoplastic polymer has a melting temperature of at least 200° C., such as at least 220° C., or at least 230° C., or at least 240° C. or at least 250° C.

or at least 260° C. In one embodiment the thermoplastic polymer comprises a thermoplastic polymer selected from polystyrene polyamide, polytetrafluoride, polyethylene terephthalate PET and polycarbonate.

In one example the method for manufacturing natural fiber plastic composite product comprises
providing a thermoplastic polymer having a melting temperature above 200° C. and deinking sludge containing cellulose fibers and minerals,
mixing the materials,
heating the mixture to a temperature in the range of 200-260° C., and
forming the mixture into a composite product.

In one example the method for manufacturing natural fiber plastic composite product comprises
providing a thermoplastic polymer having a melting temperature above 220° C. and deinking sludge containing cellulose fibers and minerals,
mixing the materials,
heating the mixture to a temperature in the range of 220-360° C., and
forming the mixture into a composite product.

A polyamide is a macromolecule with repeating units linked by amide bonds. According to the number of repeating units' types, polyamides may be homopolymers or copolymers.

Polyethylene terephthalate (PET) is a thermoplastic polymer resin, which can be used in container for beverage, food and other liquids as a recyclable material. Polyethylene terephthalate glycol modified (PETG) refers to PET wherein cyclohexane dimethanol has been added to the polymer backbone in place of ethylene glycol. PETG is clear amorphous thermoplastic which may be used in several molding applications. Generally PET tolerates high temperatures, having a melting point at about 250-260° C. PET may also be modified with isophthalic acid which replaces some of the 1,4-(para-) linked terephthalate units. This creates an angle in the PET chain, interfering with crystallization and lowering the polymer's melting point.

Polycarbonates are polymers containing carbonate groups (—O—(C=O)—O—). Most polycarbonates of commercial interest are derived from rigid monomers. A balance of useful features including temperature resistance, impact resistance and optical properties position polycarbonates between commodity plastics and engineering plastics. Polycarbonate is a durable material. Although it has high impact-resistance, it has low scratch-resistance and so a hard coating is applied to polycarbonate eyewear lenses and polycarbonate exterior automotive components. The characteristics of polycarbonate are quite like those of polymethyl methacrylate (PMMA, acrylic), but polycarbonate is stronger and usable over a greater temperature range. Polycarbonate may have a melting temperature of about 230-260° C.

Poly(methyl methacrylate) (PMMA) is a transparent thermoplastic often used as a lightweight or shatter-resistant alternative to glass. Although it is not technically a type of glass, the substance has sometimes historically been called acrylic glass. Chemically, it is the synthetic polymer of methyl methacrylate. PMMA has a melting temperature of about 160° C.

Polystyrene (PS) is a synthetic aromatic polymer made from the monomer styrene, a liquid petrochemical. Polystyrene may be rigid or foamed. General purpose polystyrene is clear, hard and brittle. It is a very inexpensive resin per unit weight. polystyrene is in a solid (glassy) state at room temperature but flows if heated above about 100° C., its glass transition temperature. It becomes rigid again when cooled. This temperature behavior is exploited for extrusion, and also for molding and vacuum forming, since it may be cast into molds with fine detail.

In general, after heating the thermoplastic polymer the product may be cooled to harden the material. Generally the cooling in continued until the temperature of the product, or at least the surface of the product, is in the range of 20-60° C. or at the ambient temperature. The cooling may be carried out in one or more steps. In one example there is a first cooling at for example about 150-180° C., and a second cooling at about 60-140° C. More than one cooling temperatures may be used to avoid large temperature variations in the formed product which may adversely affect to the structure of the product. The composite product may be given its final shape at this stage or it may be further processed, e.g. from a sheet or pellet-form by thermoforming methods such as form pressing or molding techniques.

A composite product may be in a non-foamed form, as described above, or it may be in a foamed form.

Foamed Composite Product

In one embodiment the composite product or composite material is present as foamed. More particularly one embodiment provides a natural fiber plastic composite product comprising a thermoplastic polymer and deinking sludge containing cellulose fibers and minerals in foamed form.

The foaming of plastics saves material and makes the composite lighter but more fragile. Foaming also make possible to manufacture products with high detail i.e. with high dimensional accuracy. However, the foaming of composites, such as wood plastic composites is problematic due to low melt strength and uncontrollable bubble forming. Generally the fibers, such as cellulose fibers, disturb the foaming.

In general the composite may contain the dried sludge in amounts in the range of 5-80% (w/w). However, it was discovered that when using the sludge certain amounts in the composite, for example about 60% (w/w) dry sludge, good melt strength was obtained and the good foaming of the composite was made possible. Generally it has not been possible to use such a high percentage of filler material in a composite while maintaining high melt strength. This may be due to the relatively low fiber content of the sludge and/or to the relatively small particle size thereof.

In one embodiment the composite contains dried deinking sludge in an amount in the range of 30-65% (w/w) in foamed thermoplastic polymer. In one embodiment the composite contains dried deinking sludge in an amount in the range of 55-60% (w/w) in foamed thermoplastic polymer. In one embodiment the composite contains thermoplastic polymer in an amount in the range of 35-70% and dried deinking sludge in the range of in the range of 30-65% (w/w). composite contains thermoplastic polymer in an amount in the range of 40-45% and dried deinking sludge in the range of in the range of 55-60% (w/w).

When using foamed thermoplastic polymer lighter products may be obtained while saving in the material costs because less materials are required.

The foaming is generally achieved by using a foaming or blowing agent. A blowing agent is a substance which is capable of producing a cellular structure via a foaming process in a variety of materials that undergo hardening or phase transition, such as polymers, plastics, and metals. They are typically applied when the blown material is in a liquid stage. The cellular structure in a matrix reduces density, increasing thermal and acoustic insulation, while increasing relative stiffness of the original polymer.

Blowing or foaming agents fall into two general classes: physical and chemical. Various gasses and volatile liquids are used as physical blowing agents. Chemical foaming agents (CFAs) may be organic or inorganic compounds that release gasses upon thermal decomposition. CFAs are typically used to obtain medium- to high-density foams, and are often used in conjunction with physical blowing agents to obtain low-density foams. Examples of physical foaming agents include carbon dioxide, nitrogen gas and hydrocarbons, such as pentane, isopentane, and cyclopentane.

Chemical blowing agents include for example isocyanate and water (for PUs), azo, hydrazine and other nitrogen-based materials (for thermoplastic and elastomeric foams), sodium bicarbonate (aka baking soda, used in thermoplastic foams). Here gaseous products and other by-products are formed by a chemical reaction(s), promoted by process or a reacting polymer's exothermic heat. Since the blowing reaction occurs forming low molecular weight compounds acting as the blowing gas, additional exothermic heat is also released.

A chemical blowing agent may be added to the mixture of thermoplastic polymer and the deinking sludge for example before heating the mixture or during the heating.

One embodiment provides a method for manufacturing natural fiber plastic composite product, the method comprising providing a thermoplastic polymer and deinking sludge containing cellulose fibers and minerals, mixing and foaming the materials and forming the mixture into a composite product. After mixing the materials the mixture is heated to a desired temperature to melt the thermoplastic polymer and to form melt which can be foamed and formed into the desired product. After forming the composite product the thermoplastic polymer is allowed to harden or cool to obtain the final product. In general the same materials and process conditions as explained above for regular composites may also be used for preparing foamed composites.

The temperature used for melting the thermoplastic polymer may be for example in the range of 150-360° C., such as 180-360° C. In one embodiment the temperature is in the range of 200-360° C. In one embodiment the temperature is in the range of 200-340° C. In one embodiment the temperature is in the range of 220-360° C. In one embodiment the temperature is in the range of 240-360° C. When using high temperatures, such as over 200° C. or over 220° C., polymers such as polystyrene, polyamide, polytetrafluoride, polyethylene terephthalate (PET), poly(methyl methacrylate) and polycarbonate (PC) may be used. These materials have a high melting point and therefore the obtained products will also tolerate high temperatures. At lower temperatures, such as below 180° C. or below 160° C., also polyolefins may be used. With polyolefins a temperature for example in the range of 100-190° C. or 100-180° C. may be used.

In one example the method for manufacturing foamed natural fiber plastic composite product comprises
providing a thermoplastic polymer and deinking sludge containing cellulose fibers and minerals,
mixing the materials,
heating the mixture above the melting temperature of the thermoplastic polymer,
foaming the mixture, and
forming the mixture into a composite product.

In one example the method for manufacturing foamed natural fiber plastic composite product comprises
providing a thermoplastic polymer having a melting temperature of at least 200° C. and deinking sludge containing cellulose fibers and minerals,
mixing the materials,
heating the mixture to a temperature in the range of 200-360° C.,
foaming the mixture, and
forming the mixture into a composite product.

In one example the method for manufacturing foamed natural fiber plastic composite product comprises
providing a thermoplastic polymer having a melting temperature of at least 220° C. and deinking sludge containing cellulose fibers and minerals,
mixing the materials,
heating the mixture to a temperature in the range of 220-360° C.,
foaming the mixture, and
forming the mixture into a composite product.

Two-Layered Composite Product

The ink and other impurities in the deinking sludge may affect the appearance of the final composite product. Also the color of the product may fade especially in outdoor use or storage. There may also be variations in the color and the composition of the sludge which may affect to the appearance of the product. Therefore it is possible to apply a covering layer on the colored composite containing deinking sludge, such as a non-transparent covering layer. The covering layer may be a layer of paint or the like, or it may be a layer of different composite material. The covering layer may be called a first layer or an outer layer, and the other layer containing the deinking sludge may be called a second layer, or an inner layer, or an inner composite.

One embodiment provides a natural fiber plastic composite product comprising a first layer and a second layer, the first layer forming at least a part of the surface of the product, wherein
the first layer comprises thermoplastic polymer and cellulose based particles, and
the second layer comprises thermoplastic polymer and deinking sludge containing cellulose fibers and minerals. The deinking sludge further contains ink as an impurity. The second layer may comprise any of the composite materials described herein comprising at least one thermoplastic polymer and deinking sludge containing cellulose fibers and minerals. In general the same materials and process conditions as explained above may also be used for preparing the second layer.

In one embodiment the thermoplastic polymer comprises polyolefin, such as polyethylene or polypropylene. In one embodiment the thermoplastic polymer is polyolefin.

In one embodiment the second layer contains thermoplastic polymer having a melting temperature of at least 200° C., such as at least 220° C., or at least 240° C. as described above. In one embodiment the thermoplastic polymer comprises a thermoplastic polymer selected from polyamide, PET and polycarbonate.

In one embodiment the second layer is a composite wherein the thermoplastic polymer is present as foamed. More particularly in one embodiment the second layer, or the composite material of the second layer, is present as foamed. In such case the product will be lighter and the first layer protects the foamed second layer thus providing mechanical strength and durability. The obtained products are suitable for example for outdoor use, or to any other use wherein it is desired to protect the inner layer. Therefore in one embodiment the first layer is non-foamed and the second layer is foamed.

The first layer forms at least a part of the surface of the product. In other words, the first layer covers the second layer at least partly. The amount of impurities, such as the ink, is preferably higher in the second layer of the product than in the first layer of the composite product. The first layer may cover at least one side of the second layer, for example one, two, three or four sides.

As the first layer covers at least partially the second layer, or an inner layer, the second layer may comprise large amount of the recycled deinking sludge. Because of the ink present in the sludge the color of the second layer is dark. It is usually desired that the outer surface of such a composite product has a light color so the second layer is covered with the first layer made of materials having more acceptable appearance.

Generally the method for manufacturing natural fiber plastic composite product comprises forming a first layer of the product, the first layer comprising thermoplastic polymer material and cellulose based particles, the first layer forming at least a part of the surface of the product, and forming a second layer of the product, the second layer comprising thermoplastic polymer and deinking sludge containing cellulose fibers and minerals.

One embodiment provides a method for manufacturing a natural fiber plastic composite product, the method comprising forming a first layer of the product from a mixture comprising thermoplastic polymer material and cellulose based particles, the first layer forming at least a part of the surface of the product, and forming a second layer of the product from a mixture comprising thermoplastic polymer and deinking sludge containing cellulose fibers and minerals.

One embodiment comprises foaming the mixture forming the second layer before forming the mixture into the second layer. In such case the second layer may be prepared by providing a thermoplastic polymer and deinking sludge containing cellulose fibers and minerals, mixing the materials, heating the mixture above the melting temperature of the thermoplastic polymer, foaming the mixture, and forming the mixture into a composite product.

In general the first layer is prepared by providing a thermoplastic polymer and cellulose based particles, mixing the materials, heating the mixture above the melting temperature of the thermoplastic polymer and forming the mixture into a composite product.

The first layer and/or the second layer may be formed in a lamination process, a gluing process, a molding process, an extrusion process, or a welding process.

Extrusion is a process used to create objects of a fixed cross-sectional profile. A material is pushed or drawn through a die of the desired cross-section. The two main advantages of this process over other manufacturing processes are its ability to create very complex cross-sections, and to work materials that are brittle, because the material only encounters compressive and shear stresses. It also forms parts with an excellent surface finish. In an extrusion process the thermoplastic polymer and the filler and/or reinforcement material are mixed and fed to an extruder, wherein the materials are heated to a desired temperature and pushed through a die to obtain an extrudate. Extrusion may be continuous (theoretically producing indefinitely long material) or semi-continuous (producing many pieces). One example of the extrusion process is extrusion molding.

Co-extrusion is a process of extruding two or more materials through a single die with two or more orifices arranged so that the extrudates merge and weld together into a laminar structure before chilling. Each material is fed to the die from a separate extruder, but the orifices may be arranged so that each extruder supplies two or more plies of the same material. The advantage of coextrusion is that each ply of the laminate imparts a desired characteristic property, such as stiffness, heat-sealability, impermeability or resistance to some environment, all of which properties would be impossible to attain with any single material.

It was surprisingly found out that the first layer and the second layer could be formed effectively with a co-extrusion process. The high amount of impurities in the second layer, which might interfere the attachment of the two layers together, did not encourage the use of co-extrusion. The second layer further lacks lignin or other substances which might help the attachment of the two layers together.

In one embodiment the first layer and the second layer are formed by a co-extrusion process. This process is an effective way to manufacture a product comprising two layers with different raw materials. For example, the flow properties of raw materials may be separately controlled during the co-extrusion process. By using co-extrusion the properties of the "weaker" second layer, such as a foamed layer, may be compensated. The co-extruded non-foamed first layer provides strength to a product having a foamed second layer because of its higher impact strength and lower amount of impurities. The second layer containing deinking sludge may be effectively attached to the first outer layer with co-extrusion. This provides an effect of enabling manufacturing various products having prolonged durability and which tolerate mechanical stress. Such products may be for example used outdoors and as floor elements or the like. The co-extrusion may be used especially for polyolefins, such as polyethylene or polypropylene, which may not be attached properly by laminating or by using an adhesive or adhesive tape.

In one example, the first layer and the second layer are first formed separately, for example in an injection molding process or in an extrusion process, after which the layers are attached to each other, for example, in a lamination process.

In one example one of the dimensions of the composite product is at least 10 times greater than two other dimensions of the product.

In one embodiment the natural fiber plastic composite product is a building element, such as a decking board or a façade panel, or a landscaping element. Examples of the composite product include a railing, a fence, or a noise barrier. The natural fiber plastic composite product may also be a product that is used to cover the surface of another product, such as a cover strip.

The following reference numbers are used in the figures:

11 natural fiber plastic composite product, also called composite product, 12 first layer of the natural fiber plastic composite product, 12a thickness of the first layer, 13 second layer of the natural fiber plastic composite product, 13a thickness of the second layer, 14 hole in the natural fiber plastic composite product, 21 fastener, 21b head of the fastener, 22 fastening member, 23 base element, 31 raw materials for the natural fiber plastic composite product, and 32 apparatus adapted to form the natural fiber The term "first layer" 12 of the natural fiber plastic composite product 11 refers to a layer that forms at least a part of the surface area of the composite product 11. Preferably the first layer 12 is at least partly visible when the product 11 is in use. For example, in the case of a building element, the first layer 12 preferably forms the surface of a side that is visible in use. In the case of a decking board that forms a part of a floor, the first layer 12 preferably covers at least the top side of said decking board.

The term "second layer" 13 of the natural fiber plastic composite product 11 refers to a layer that is at least partly covered by the first layer 12. In other words, the term "second layer" 13 of the natural fiber plastic composite product refers to a layer that is at least partly "underneath" the first layer 12. The second layer 13 may also be an inner layer. Preferably, the second layer 13 is not visible when the product 11 is in use. However, in an example, the second layer is partly visible when the product 11 is in use.

The natural fiber plastic composite product 11 may comprise two layers. It may also comprise more than two layers, for example, three, four, five, six, seven, eight, or even more than eight layers. In some examples the product 11 comprises two, three or four layers. In an example, there is at least one adhesive layer between the first layer and the second layer.

The term "cellulose based particles" refers to cellulose particles that may originate from any plant material that contains cellulose. The particles may be in the form of dust (powder); preferably they are, at least partly, in the form of fibers. In this application, the particles having a length of at least 0.1 mm, more preferably at least 0.2 mm are called fiber particles or fibers, and smaller particles than those mentioned above are called powder-particles or powder.

The natural fiber plastic composite may be, for example, a wood plastic composite, i.e. the cellulose based particles originate from wood. In an example, at least 30% (w/w), more preferably at least 80% (w/w) and most preferably at least 90% (w/w) of the cellulose based particles of the first layer are wood based particles. The wood material may be softwood trees, such as spruce, pine, fir, larch, douglas-fir or hemlock, or hardwood trees, such as birch, aspen, poplar, alder, eucalyptus, or acacia, or a mixture of softwoods and hardwoods. Non-wood material may be agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo, or reed. The cellulose based particles may be virgin or recycled.

In one example the cellulose based particles in the first layer 12 of the product 11 comprise cellulose based particles that have low lignin content. Advantageously, the cellulose based particles comprises chemically treated cellulose particles (i.e. so called lignin free cellulose particles). Alternatively or in addition, the cellulose based particles originate from plant material(s) in which the lignin content of the particles is naturally low.

The amount of the recycled raw materials as well as other raw materials of uneven quality and/or colored raw materials may need to be increased in the composite product 11 due to environmental reasons and/or efficiency reasons. However, it has been observed that the amount of defects on the surface of the manufactured product 11 may increase with an addition of said raw materials and, therefore, the appearance and/or strength properties of the surface of the composite product 11 may decrease. Now, due to the novel composite product 11 comprising a first layer that covers at least a part of the surface of the product 11, it is possible to use a greater amount of recycled material and/or colored material and/or material of uneven quality as raw material for the composite product 11 than in conventional products. Thus, the product 11 may be more environmentally friendly and/or more economical than conventional products.

Figure 1B:
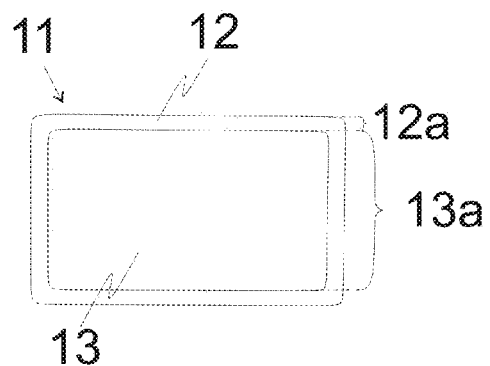
Figure 1C:
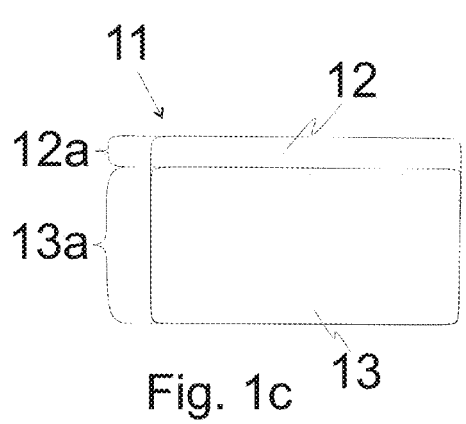
Figure 1D:
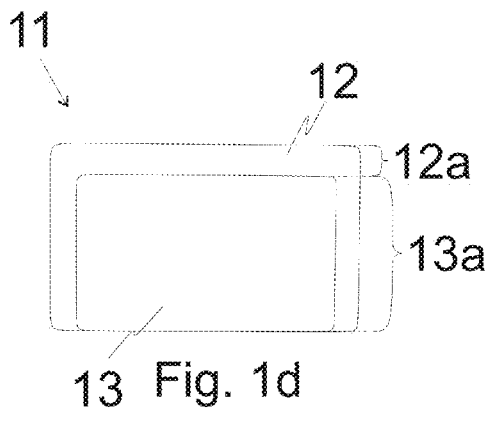
Figure 1E:
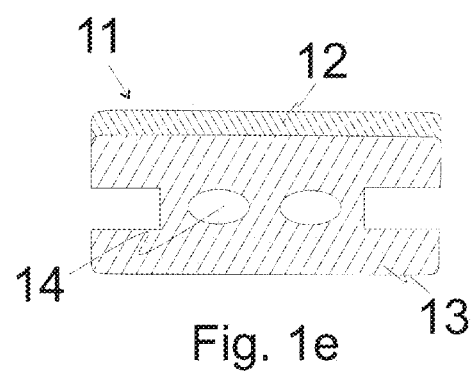

FIGS. 1a to 1e show some examples of the product 11 comprising the first layer 12 and the second layer 13. In FIGS. 1a to 1e, among other things, the thickness 12a of the first layer 12 and the thickness 13a of the second layer are illustrated. FIG. 1e shows an example of a composite product 11 having holes 14.

The first layer 12 may form the entire surface area of the product 11. In this case, the first layer 12 covers the second layer 14 totally. Alternatively, only a part of the second layer 13 may be covered by the first layer 12.

FIGS. 1a and 1c show examples in which the first layer 12 covers one surface of the composite product 11. FIG. 1b shows an example in which the first layer 12 covers at least four surfaces of the composite product 11 at least partly, preferably the whole surface area of the composite product 11. FIG. 1d shows an example in which the first layer 12 covers at least three of the surfaces at least partly. FIG. 1e shows an example of the end side of a building panel. The building panel shown in FIG. 1e comprises two holes 14, but the number of the holes may vary. Preferably, the composite product comprises one, two, three, four, five or six holes 14. In another example, the composite product does not comprise any holes 14. Thus, the product 11 may be formed as a solid or hollow profile. The weight of the composite product 11 typically decreases due to the holes 14.

In one example the first layer 12 of the composite product forms at least 50% or at least 60%, more preferably at least 70% or at least 80%, and most preferably at least 90% or at least 95% of the surface area of the composite product. Most advantageously, the first layer 12 of the composite product forms at least 60% or at least 70%, more preferably at least 80% or at least 90% and most preferably at least 95% or at least 99% of the surface area of the product 11 that is visible in use.

The thickness 12a of the first layer 12 of the composite product 11 is preferably at least 0.2 mm or at least 0.3 mm, more preferably at least 0.4 mm or at least 0.5 mm, and most preferably at least 0.6 mm or at least 0.7 mm. In addition, the thickness 12a of the first layer 12 of the composite product 11 is preferably not greater than 5 or 4 mm, more preferably not greater than 3 or 2.5 mm, and most preferably not greater than 2.0 or 1.5 mm. In an example, the thickness 12a of the first layer 12 is between 0.2 and 5 mm. The thickness 12a of the first layer 12 of the composite product 11 is preferably determined as the median thickness of the first layer. If the product 11 comprises a side that is visible when the product 11 is in use, the thickness 12a of the first layer 12 is preferably determined as the median thickness of that side of the product 11.

The thickness 13a of the second layer is preferably between 0.5 and 40 mm, more preferably between 1 and 20 mm, and most preferably between 3 and 10 mm. The thickness 13a of the second layer 13 is preferably calculated as the median thickness of the second layer.

In one example the length of the product is at least 10 times, more preferably 50 or 100 times, and most preferably 200 times greater than the thickness of the product. Alternatively or in addition, the width of the product is at least 2 times, more preferably at least 3 times, and most preferably at least 5 times greater than the thickness of the product.

The first layer of the composite product comprises cellulose based particles. Due to the cellulose based particles, the properties of the first layer may be improved. In one example the amount of the cellulose particles in the first layer of the product is in the range of 5-80% (w/w), or in the range of 10-70% (w/w), more preferably in the range of 15-60% (w/w) or in the range of 20-50% (w/w), and most preferably in the range of 30-40% (w/w). The cellulose particles preferably comprise wood dust and/or mechanical pulp and/or chemical pulp, from which the chemical pulp in powder form or fiber form is preferably used, and chemical pulp in the form of fibers is most preferably used. In one example at least 60% (w/w), preferably at least 70% (w/w) or at least 80% (w/w), and most preferably at least 90% (w/w) or at least 95% (w/w) of the cellulose based particles in the first layer of the product are particles having a low lignin content, i.e. chemically treated cellulose particles and/or plant material in which the lignin content of the fibers is naturally low. In one example the amount of the lignin in the first layer of the product calculated from the total amount of the cellulose based particles in the first layer is lower than 15% (w/w) or lower than 10% (w/w), more preferably lower than 5% (w/w) or lower than 3% (w/w), and most preferably lower than 2% (w/w) or lower than 1% (w/w).

Preferably the first layer of the natural fiber plastic composite product comprises thermoplastic polymer. The total amount of the thermoplastic polymer(s) may be in the range of 20-80% (w/w), such as in the range of 20-60% (w/w) of the first layer. The first layer may comprise thermoplastic polymers that are virgin and/or recycled. Advantageously, the first layer comprises virgin thermoplastic polymer(s). Examples of thermoplastic polyolefins include polyethylene, polypropylene, polymethylpentene, and polybutene-1.

In one embodiment the thermoplastic polymer comprises or consists of polyolefin, i.e. polypropylene (PP) and/or polyethylene (PE). If polyolefin is used, a low temperature may be used in the manufacturing process of the composite product and therefore darkening of the cellulose based particles may be avoided. Advantageously, at least 60% (w/w) or at least 70% (w/w), more preferably at least 75% (w/w) or at least 80% (w/w) and most preferably at least 85% (w/w) or at least 90% (w/w) of the thermoplastic polymers used in the first layer are polyolefins.

In an example, the thermoplastic polymer comprises polylactide (PLA). In this case, the total amount of the polylactides may be at least 30% (w/w) or at least 40% (w/w), for example at least 50% (w/w) or at least 60% (w/w) or at least 70% (w/w) or at least 80% (w/w) of the thermoplastic polymers in the first layer.

In an example, the first layer and/or the second layer of the product comprises polyvinyl chloride (PVC). In this case, the total amount of the PVCs in said layer is advantageously at least 10% (w/w), such as at least 30% (w/w), for example at least 50% (w/w) of plastic polymers in said layer.

The first layer may comprise mineral fillers. The mineral filler preferably comprises kaolin clay, wollastonite, ground calcium carbonate, precipitated calcium carbonate, titanium dioxide, talcum, mica, silica or a mixture consisting two, three, four, five or six of said mineral fillers. Most preferably, the mineral filler in the first layer comprises or consists of talcum.

In one example the first layer comprises 20-80% (w/w) thermoplastic polymers, 5-80% (w/w) cellulose based particles, and 0-20% (w/w) mineral fillers, the total content of said materials forming at least 90% (w/w), such as at least 95% (w/w), for example at least 97% (w/w) of the first layer. In addition, the first layer may comprise, for example, additives, such as colorants, UV stabilizers, coupling agents, foaming agents (blowing agents) and/or lubricants.

At least in the case of polyolefin, the composite product may comprise coupling agent(s). The coupling agent may comprise, for example, maleic anhydride functionalized HDPE, maleic anhydride functionalize LDPE, maleic anhydride-modified polyethylene (MAHPE), maleic anhydride functionalized EP copolymers, acrylic acid functionalized PP, HDPE, LDPE, LLDPE, and EP copolymers, styrene/maleic anhydride copolymers, vinyl trialkoxy silanes, or combinations thereof.

The second layer that is at least partly covered by the first layer may comprise further recycled material(s) comprising different colors. Due to the first layer, the composite product may be weatherproof, it may have good strength properties, and there may not be any defects on the surface of the product; even the raw materials of the second layer may vary from time to time.

The first layer may comprise less than 5% (w/w) or less than 3% (w/w), more preferably less than 2% (w/w) or less than 1% (w/w) and most preferably less than 0.5% (w/w) of impurities. In some examples the first layer comprises less than 5% (w/w) or less than 3% (w/w), more preferably less than 2% (w/w) or less than 1% (w/w) and most preferably less than 0.5% (w/w) of materials, such as lignin, print ink, silicone and/or adhesives, or combinations thereof. In one embodiment the first layer comprises less than 5% (w/w) or less than 3% (w/w), more preferably less than 2% (w/w) or less than 1% (w/w) and most preferably less than 0.5% (w/w) of print ink. In one embodiment the first layer does not contain any print ink. In some examples the first layer comprises less than 5% (w/w) or less than 3% (w/w), more preferably less than 2% (w/w) or less than 1% (w/w) and most preferably less than 0.5% (w/w) of lignin.

Due to the small amount of the impurities in the first layer, and the thermoplastic polymer and the cellulose particles therein, the surface of the product may have good strength properties together with a good appearance even if the product comprises a significant amount of impurities in the second layer of the product.

Figure 2:
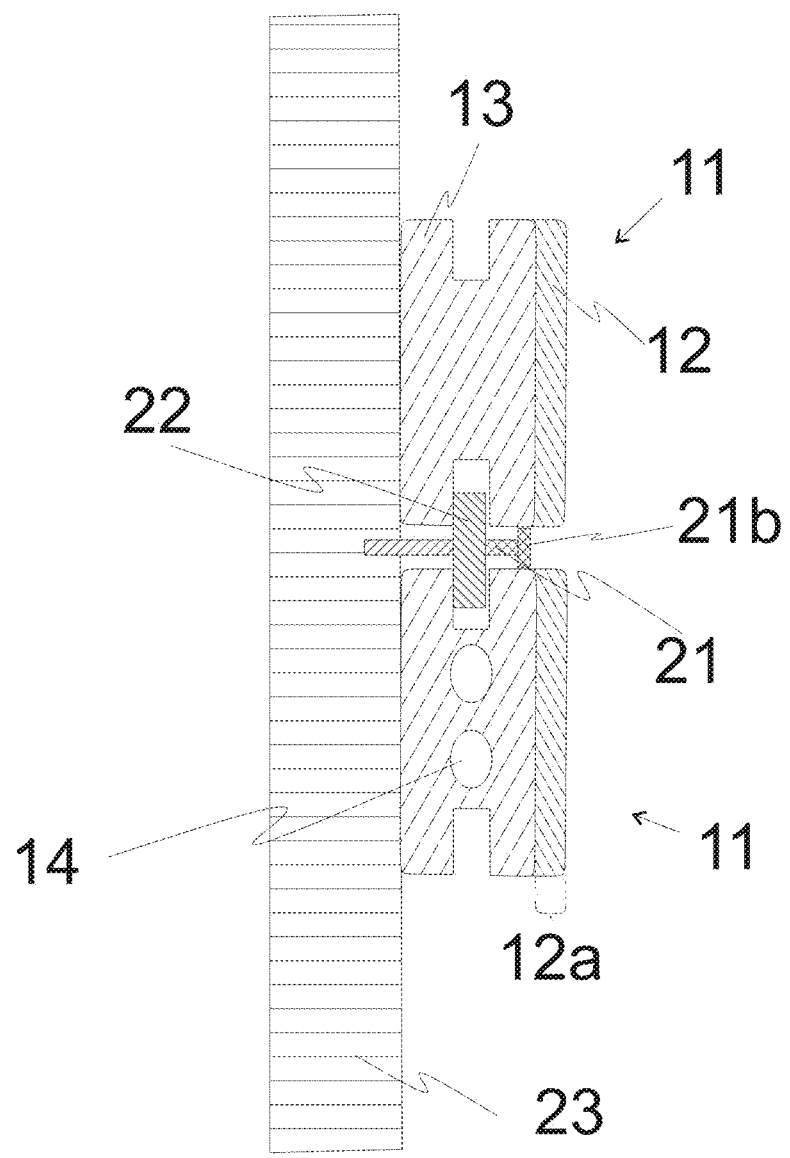
FIG. 2 shows an example of an arrangement according to an embodiment

FIG. 2 shows an example of an arrangement. In FIG. 2 the composite product 11, the first layer 12, a thickness 12a of the first layer, the second layer 13, a hole 14 of the product 11, a fastener 21, a head 21b of the fastener, a fastening member 22, and a base element 23 are shown.

Preferably, the composite product 11 has a structure that is compatible with the fastening member 22 in order to achieve good fastening of the composite product 11 to the base element 23. There may be some thermal expansion in the composite product 11 in use that needs to be taken into account.

According to an embodiment, the composite product is a decking board or a façade panel and the structure of the composite product 11 is such that a fastening member 22, preferably a so called T-clip manufactured by UPM Corporation, may be used with the composite product 11. The fastening member 22 may be used in order to fasten the manufactured composite product, preferably together with a fastener 21, such as a screw or a nail.

The fastener 21 may also be used without the fastening member 22. In an example, the composite product comprises elongated holes that are used for the fasteners 21, for example a screw or a nail. Due to the elongated holes, thermal expansion of the composite product is allowed. In another example, the fastening of implemented by so called support rail fastening member, such as an alu rail fastening member.

The product 11 may be installed in such a way that the first layer 12 forms the surface of the product 11 that is visible.

In an example the natural fiber plastic composite product 11 is fastened in order to form a part of the building. In an example, the natural fiber plastic composite is fastened in order to form a part of the terrace.

In an example, the fastener 21 comprises a head 21*b*. In this case, the fastener may be, for example, a screw or a nail, preferably the screw. Advantageously the head 21*b* of the screw 21 is parallel with the surface of the product 11 as is shown in FIG. 2. Advantageously, the fastener 21 is used together with a fastening member 22 to fasten the composite product 11 to the base element 23. The fastening member may have, for example, a T-profile.

Figure 3:
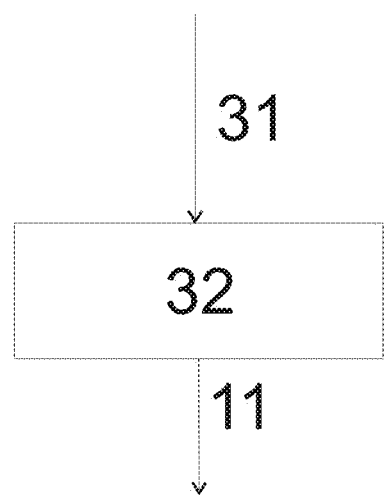
FIG. 3 shows an example of a method according to an embodiment in a reduced schematic chart

FIG. 3 shows an exemplary embodiment in a reduced schematic chart. FIG. 3 shows raw material 31 for the natural fiber plastic composite product 11, an apparatus 32 adapted to form the natural fiber plastic composite product 11, and a natural fiber plastic composite product 11.

The system according to the present invention preferably comprises at least one supplying device to feed the raw materials 31 to the apparatus 32, which apparatus 32 forms the natural fiber plastic composite product 11. The apparatus may contain means for mixing the raw materials 31. The apparatus contains means for heating the raw materials to a desired temperature, and preferably means for monitoring, controlling and maintaining the desired temperature. In one embodiment the apparatus contains means for mixing and means for heating the material. In one example the apparatus 32 is an extruder. In one example the apparatus 32 is a co-extruder. In one example the apparatus 32 is an injection molding apparatus.

The first layer and the second layer are preferably formed by an extrusion process using an extruder. In one embodiment the first layer and the second layer are formed by a co-extrusion process. In these cases, the manufacturing apparatus 32 comprises an extruder, such as a hot extruder. The extruder may comprise at least one extrusion screw. In one example the extruder is a twin-screw extruder. In one example the extruder is a tandem extruder, for example wherein the material is melted in a first device, transferred to a second device wherein gas is injected to the material.

In a general example raw compound material in the form of nurdles (small beads, often called resin in the industry) is gravity fed from a top mounted hopper into the barrel of the extruder. Additives (in either liquid or pellet form) are often used and can be mixed into the resin prior to arriving at the hopper. The material enters through the feed throat (an opening near the rear of the barrel) and comes into contact with the screw. The rotating screw (for example turning at up to 120 rpm) forces the plastic beads forward into the heated barrel. The desired extrusion temperature is rarely equal to the set temperature of the barrel due to viscous heating and other effects. In most processes, a heating profile is set for the barrel in which three or more independent PID controlled heater zones gradually increase the temperature of the barrel from the rear (where the plastic enters) to the front. This allows the plastic beads to melt gradually as they are pushed through the barrel and lowers the risk of overheating which may cause degradation in the polymer. Extra heat is contributed by the intense pressure and friction taking place inside the barrel.

After passing through the barrel the molten mixture enters the die. The die is what gives the final product its profile and is designed so that the molten plastic evenly flows from a cylindrical profile, to the product's profile shape. Finally the product is passed through a calibration unit that controls the cross-sectional profiles. During the calibration the material is processed into a desired shape by using vacuum. The properties of the composite material, such as a good melt strength, will facilitate the calibration and enable the production of products with high quality.

After this the product is cooled. This may be achieved by pulling the extrudate through a water bath. However, plastics are very good thermal insulators and are therefore difficult to cool quickly.

In an example, the product is manufactured in a molding process, such as an injection molding process, or in a lamination process, a gluing process, a molding process, or a welding process.

In an example, the layers are first formed separately, for example in a molding process or in an extrusion process, after which the formed layers are attached to each other, for example, in a lamination process. In other words, the first layer and the second layer may be laminated with each other in order to form the product. In this case, the manufacturing apparatus 32 comprises a laminating device.

The composite products described herein may be used in various applications. The "composite product" includes also the products containing foamed polymer, and the products comprising a first layer and a second layer. In one example the composite product is a building element, such as a decking board or a façade panel. In the case of the decking board or the façade panel, the product may comprise holes, or the product may be a so called solid profile without any holes.

In one embodiment the product is a railing or a fence.

In one embodiment the product is a cover strip.

In one embodiment the product is a noise barrier.

In one embodiment the product is a pole.

In one embodiment the product is a frame, such as a frame for shelves or cabinets, such as kitchen cupboard or furniture, or a kitchen-sanitary building block module or the like.

In one embodiment the product is a furniture or a part of a furniture.

The final product may be a product having a small wall thickness, such as less than 5 mm, or less than 3 mm or about 1 mm.

In one embodiment the product is a board or panel, such as a building board or panel, wall board or panel, floor board or panel, ceiling board or panel and the like.

One embodiment provides a building comprising said composite product, wherein the natural fiber plastic composite is fastened by the fastener in order to form a part of the building.

One embodiment provides a terrace comprising said composite product, wherein the natural fiber plastic composite is fastened by the fastener in order to form a part of the terrace.

One embodiment provides an arrangement comprising said composite product, a fastening member, and a base element, wherein the composite product is fastened to the base element by the fastening member and the fastener, wherein the fastener comprises a head, and the head is parallel with a surface of the product.

One embodiment provides use of a natural fiber plastic composite product comprising a thermoplastic polymer and deinking sludge containing cellulose fibers and minerals in the above-mentioned products, such as in a building element, in a railing or a fence, in a cover strip, in a pole, in a frame, such as a frame for shelves, or in a furniture or a part of a furniture. The "composite product" includes also the products containing foamed polymer or composite, and the products comprising a first layer and a second layer, and combinations thereof, as described herein.

EXAMPLES

Deinking Sludge Composite

Deinking sludge containing 19% of cellulose fibres was mixed with polyolephins. The material was granulated and injection moulded into test specimens. The properties were compared to pure PP and PE and compounds containing talcum.

The amounts of 10%, 20% and 50% of deinking sludge was mixed with polypropylene (PP). The amounts of 10% and 50% of deinking sludge was mixed with polyethylene (PE).

Figure 4:
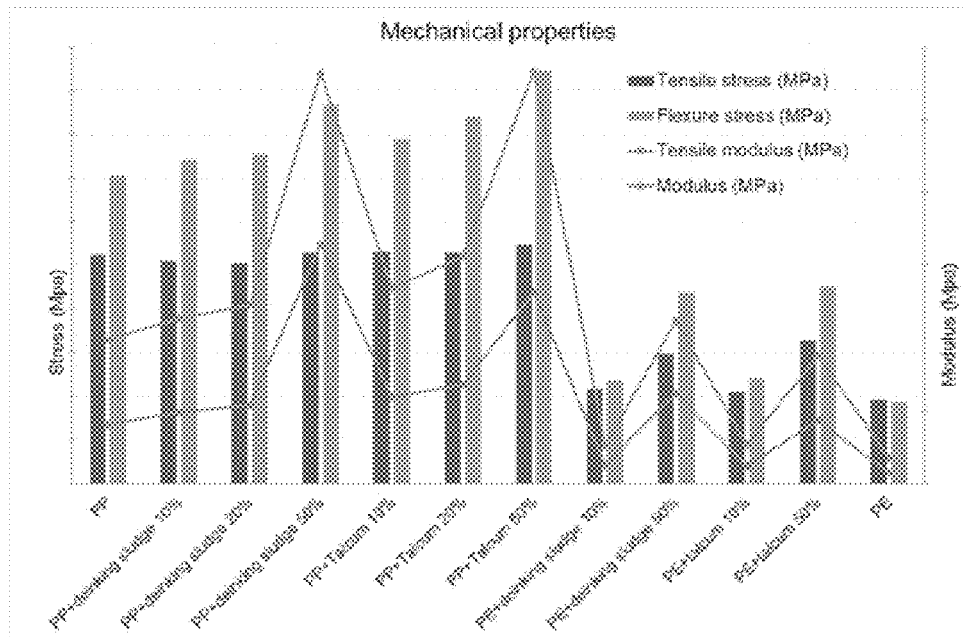
FIG. 4 shows tensile strength and flexure strength of obtained products.

The tensile strength and 3-point bending strength were measured according to ISO 527 and ISO 178. The results are shown in FIG. 4.

Figure 5:
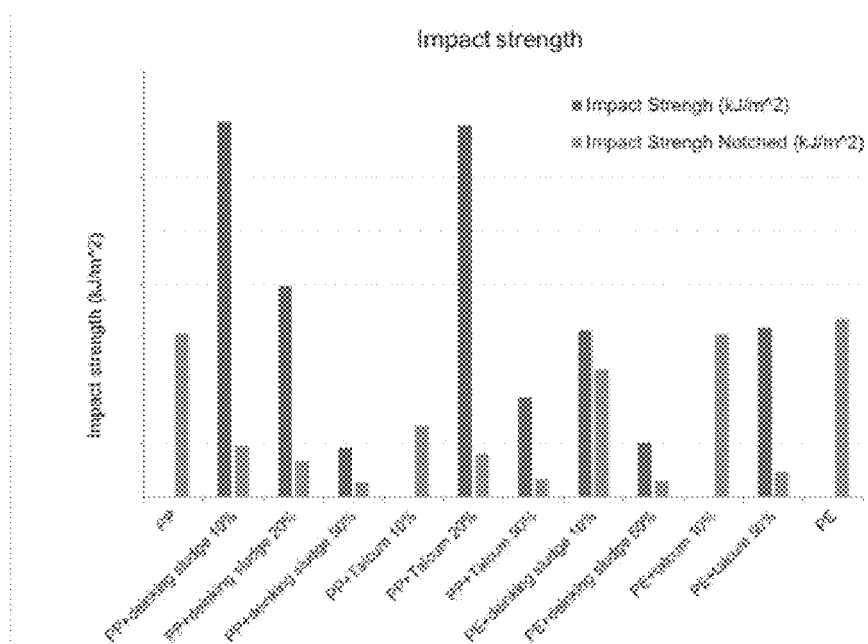
FIG. 5 shows impact strength of obtained products

The impact strength was measured according to ISO 179. The notched and unnotched impact strength was tested. PP and PE do not break when not notched. The same was also observed when 10% talcum was added. The results are shown in FIG. 5.

Industrial Trial

In second trial was done in industrial scale. The recycled polyethylene (PE) was mixed with deinking sludge. The recipe used was:

Recycled polyethylene (PE-HD) 38%
Deinking sludge 59%
Coupling agent MAHPE 3%

Figure 6:
FIG. 6 shows an example of a product

Material was mixed and extruded into hollow profile. The properties of the profile were measured as follows: 3-point bending, water absorption, impact strength, density, hardness and wear resistance according to EN 310, EN 317, EN 477, ISO 1183, EN 1534, EN 438-2. The results are shown in Table 1. FIG. 6 shows the obtained product.

TABLE 1

| Property | Test method | Value |
| --- | --- | --- |
| Density (g/cm$^3$) | ISO 1183 | 1.34 |
| Bending strength (N) | EN 310 | 2400 |
| Stiffness (N/mm$^2$) | EN 310 | 2200 |
| Impact strength (J) | EN 477 | 3/6 breaks |
| Water absorption 24 hours (w-%) | EN 317 | 0.22 |
| Brinell hardness (N/mm$^2$) | EN 1534 | 28 |
| Wear resistance Taber (1000 r; mm) | EN 438-2 | 0.19 |

The invention claimed is:

1. A natural fiber plastic composite product consisting of
   10-70% by weight of a thermoplastic polymer;
   30-90% by weight of dried deinking sludge containing organic material in the range of 25-45% by weight, minerals in the range of 55-75% by weight, and ink;
   a foaming agent; and
   optionally, minor amounts of colorants, UV stabilizers, coupling agents, lubricants, and incidental impurities;
   wherein the organic material comprises cellulose fibers in the range of 10-30% by weight based on the weight of the dried deinking sludge, and
   wherein the composite product is in foamed form.

2. The natural fiber plastic composite product of claim 1, wherein the thermoplastic polymer comprises polyolefin.

3. The natural fiber plastic composite product of claim 1, wherein the thermoplastic polymer has a melting temperature of at least 200° C.

4. The natural fiber plastic composite product of claim 1, wherein the thermoplastic polymer comprises a thermoplastic polymer selected from the group consisting of polystyrene, polyamide, polytetrafluoride, polyethylene terephthalate and polycarbonate.

5. A natural fiber plastic composite product comprising a first layer and a second layer, the first layer forming at least a part of the surface of the product, wherein
   the first layer comprises thermoplastic polymer and cellulose based particles, and
   the second layer comprises the foamed natural fiber plastic composite product of claim 1.

6. A composite product containing the natural fiber plastic composite product of claim 1, wherein the composite product is a building element, a decking board, a façade panel, a railing, a fence, a cover strip, a noise barrier, a pole, a frame, a board or panel, a furniture, or a part of a furniture.

7. The natural fiber plastic composite product of claim 1, wherein the thermoplastic polymer comprises polypropylene or polyethylene.

8. The natural fiber plastic composite product of claim 1, wherein the thermoplastic polymer has a melting temperature of at least 220° C.

9. The natural fiber plastic composite product of claim 1, wherein the thermoplastic polymer is in an amount in the range of 30-45% by weight and the dried deinking sludge is in the range of 55-70% by weight.

10. A method for preparing a natural fiber plastic composite product consisting of
    10-70% by weight of a thermoplastic polymer;
    30-90% by weight of dried deinking sludge containing organic material in the range of 25-45% by weight, minerals in the range of 55-75% by weight, and ink;
    a foaming agent; and
    optionally minor amounts of colorants UV stabilizers coupling agents lubricants and incidental impurities;
    wherein the composite product is in foamed form,
    the method comprising
    mixing the thermoplastic polymer, the dried deinking sludge, the foaming agent, and, optionally, the colorants, UV stabilizers, coupling agents, lubricants, and incidental impurities to provide a mixture,
    heating the mixture above the melting temperature of the thermoplastic polymer,
    foaming the mixture, and
    forming the mixture into the composite product.

11. The method of claim 10, wherein the thermoplastic polymer comprises polyolefin.

12. The method of claim 10, wherein the thermoplastic polymer has a melting temperature of at least 200° C.

13. The method of claim 10, wherein the mixture is heated to a temperature in the range of 200–360° C.

14. The method of claim 10, wherein the thermoplastic polymer comprises a thermoplastic polymer selected from the group consisting of polystyrene, polyamide, polytetrafluoride, polyethylene terephthalate and polycarbonate.

* * * * *